US005724385A

United States Patent [19]
Levin et al.

[11] Patent Number: 5,724,385
[45] Date of Patent: Mar. 3, 1998

[54] SERIAL LINKED INTERCONNECT FOR SUMMATION OF MULTIPLE WAVEFORMS ON A COMMON CHANNEL

[75] Inventors: Jeffrey A. Levin; Kenneth D. Easton; Jurg Hinderling, all of San Diego, Calif.; Lindsay A. Weaver, Jr., Boulder, Colo.; Michael P. Brock, San Diego, Calif.

[73] Assignee: Qualcomm Incorporated, San Diego, Calif.

[21] Appl. No.: 316,156

[22] Filed: Sep. 30, 1994

[51] Int. Cl.⁶ .................................................. H04B 1/38
[52] U.S. Cl. ................................................. 375/222; 375/206
[58] Field of Search ......................... 375/200, 208, 375/209, 210, 222, 299, 206; 370/18, 208, 320; 455/33.1, 54.1

[56] References Cited

U.S. PATENT DOCUMENTS

| 5,016,255 | 5/1991 | Dixon et al. | 375/208 |
| 5,103,459 | 4/1992 | Gilhousen et al. | 375/200 |
| 5,319,672 | 6/1994 | Sumiya et al. | 375/208 |
| 5,347,537 | 9/1994 | Mori et al. | 375/208 |

FOREIGN PATENT DOCUMENTS 0590412  4/1994  European Pat. Off.

OTHER PUBLICATIONS

Richard Kerr et al., "The CDMA Digital Cellular System an Asic Overview", *IEEE Custom Integrated Circuits Conference*, May 3–6, 1992, pp. 10.1.1–10.1.7.

Valy Lev et al., "Development of Mobile Communications Systems in a World of Standards: A Case Study", MRC Mobile Radio Conference, Valbonne, France, Nov. 13–15, 1991, pp. 145–150.

Behague et al., "Modularity and Flexibility: The Keys to Base Station System Configuration for the GSM Network", MRC Mobile Radio Conference Valbonne, France, Nice France,Nov. 13–15, 1991, pp. 160–168.

*Primary Examiner*—Tesfaldet Bocure
*Assistant Examiner*—Bryan Webster
*Attorney, Agent, or Firm*—Russell B. Miller; Brian S. Edmonston

[57] ABSTRACT

A modulator for a spread spectrum telecommunication system not only receives local data and processes it, but also receives input data from one or more other modulators, sums the input data with the local data, and provides the sum as data for a subsequent modulator or as final output for a transmit power amplifier. The modulator includes an input block and an output block and, depending on a control data signal, input data will be summed with the internally generated local data of the modulator before being provided to the output block. The output data can include parity data. The parity data can be used to check for faults such as might be introduced, for example, by a faulty connection or broken hard-wired interconnect. If an error is detected, the summation function of the transmit modulator can be automatically disabled.

23 Claims, 7 Drawing Sheets

SERIAL LINKED INTERCONNECT FOR SUMMATION OF MULTIPLE WAVEFORMS ON A COMMON CHANNEL

BACKGROUND OF THE INVENTION

I. Field of the Invention

This invention relates generally to spread spectrum telecommunication systems and, more particularly, to cellular telephone system signal processing.

II. Description of the Related Art

To facilitate a large number of users in a telecommunication system over a limited electromagnetic spectrum, one of a variety of multiple access spread spectrum techniques is used. These techniques include, for example, time division multiple access (TDMA), frequency division multiple access (FDMA), and code division multiple access (CDMA). The CDMA technique has many advantages over the other techniques and an exemplary CDMA system is described in U.S. Pat. No. 4,901,307 issued Feb. 13, 1990 to K. Gilhousen et al. entitled "Spread Spectrum Multiple Access Communication System Using Satellite or Terrestrial Repeaters," assigned to the assignee of the present invention, and incorporated herein by this reference.

In the CDMA cellular telephone system described in the above-referenced '307 patent, a large number of mobile telephone system users, each having a transceiver, communicate through satellite repeaters or terrestrial base stations, which are also referred to as cell site stations, cell sites, or simply as cells. Each cell covers a limited geographic area and routes calls carried over cellular telephone transceivers in the cell to and from the public switched telephone network (PSTN). When a cellular telephone user moves to a new cell, the routing of that user's call is transferred to the new cell.

Thus, a cellular telephone transceiver, or mobile unit, broadcasts a mobile signal that is received by a cell site and then is routed to the PSTN and to telephone lines or other mobile units. The cell site broadcasts a cell signal that is received by mobile units within the cell area. The cell-site-to-mobile-unit signal transmission is generally referred to as the forward link and the mobile-unit-to-cell-site signal transmission is generally referred to as the reverse link.

The CDMA technique splits the available system frequency spectrum into multiple sub-bands and permits the frequency spectrum to be effectively used multiple times within the same time interval, thus permitting an increase in the number of calls that can be in progress at any one time. The CDMA technique described in the above-referenced '307 patent makes use of high frequency pseudonoise (PN) modulation of calls, as well as modulation of calls by orthogonal binary sequences, to combine the many calls and broadcast the sum of the data as a single CDMA signal. In this way, the CDMA technique permits discrimination between many calls that occupy the same frequency band and provides increased spectral efficiency as compared with other techniques. More particularly, the system described in the patent modulates all calls from the same cell with the same "outer" PN codes, which define I and Q channels. Individual calls are further modulated by an "inner" user PN code and by an orthogonal binary sequence of a type known as a Walsh function, also known as Hadamard matrices.

Thus, the CDMA call signal transmitted by a cell site to mobile units over the forward link signal path will comprise the sum of many modulated calls that occupy the same frequency band. A system and method for modulating and demodulating the CDMA call signals is described, for example, in U.S. Pat. No. 5,103,459 issued Apr. 7, 1992 to K. Gilhousen et al. and entitled "System and Method for Generating Signal Waveforms in a CDMA Cellular Telephone System," assigned to the assignee of the present invention, and incorporated herein by this reference. FIG. 1 is a block diagram of the cell site equipment described in the '459 patent for transmitting the CDMA signal to mobile units.

FIG. 1 shows that a call channel user generates, for example, voice data in a voice data block 12 that provides the data to a first transmit modulator 14, which operates under the control of a channel microprocessor 16. In the transmit modulator, the voice data is provided to an encoder 18 and then to an interleaver 20 which, along with output from a PN generator block 22, provide input to a Walsh code processor 24. The output from the Walsh code processor leaves the modulator 14 and is provided to a transmit power control block 26 that adds power control bits to regulate the transmitted signal power. The output of the transmit power control block is provided to a summer 28 and then to a transmit power amplifier 30 and to an antenna 32 for broadcast to mobile users in the cell associated with the antenna.

In the system described in the '459 patent, voice data from a voice data block 34 and output from a second transmit modulator 36 can be summed with the output from the first transmit modulator 14 by the summer 28 before being provided to the transmit power amplifier 30. That is, the summer is a discrete component that sums the signals from two separate transmit modulators and provides the result to an amplifier for amplification and subsequent broadcast. The summer reduces the number of amplifiers and associated control circuitry necessary, and thereby reduces cost and increases efficiency. The number of transmit modulator output signals, and the number of summers used, as well as the supporting logic circuitry, can be adapted for the requirements of particular applications. If desired, multiple modulators can provide data to the summer 28 or multiple summers can provide summed output to the amplifier 30 to combine the desired number of data signals.

As noted in the '459 patent, the encoding of the voice data with PN and Walsh data ensures that individual calls can be subsequently decoded and distinguished from one another. In particular, the data from each power control 26, 38 is produced in sample sizes of nine bits and the output of the summer 28 is produced in sample sizes of ten bits. Data is produced in I and Q channels at a rate of 5 MHz, thereby producing a data stream of 90 Mbits per second. Each modulator includes four parallel output lines. Thus, connecting three modulators to a summer results in sixteen hard-wired interconnects between the modulators and the transmit amplifier.

Because the summer 28 is a discrete component, it requires hard-wired interconnections between each channel signal. These interconnections add cost, take up space, and provide an opportunity for circuit breaks to occur, which disrupt signal transmission. The number of transmit modulators connected to each summer can be increased, but each transmit modulator still would require a hard-wired interconnection, and the associated control circuitry can become relatively complex. Moreover, the relatively large number of hard-wired interconnections can become bulky and cumbersome, and can add to production costs. Also, the number of interconnections can be limited by the space available to make them. Finally, as the number of interconnections increases, so does the risk of errors due to faulty connections or broken wires.

From the discussion above, it should be apparent that there is a need for an apparatus that can efficiently sum the output from multiple transmit modulators without increasing the risk of errors or requiring an excessive number of hard-wired interconnections. The present invention satisfies this need.

SUMMARY OF THE INVENTION

In accordance with the invention, an apparatus for modulating data in a spread spectrum telecommunication system includes a modulator processor that not only receives local data and processes it for subsequent transmission, but also receives input in the form of independently processed data from one or more other modulators, sums the input data with the processed local data, and provides the sum as data for a subsequent modulator or as a final output for another system processor. In this way, a separate, discrete signal summer that sums modulated data from several modulators is unnecessary. Rather, a series of modulators can be serially connected and their respective signals summed before the output of the last modulator of the series is produced as a final output that can be provided directly to a power amplifier for transmission over the system. This simplifies the circuit topology for the summing of modulated data, reduces the number of hard-wired interconnections and associated circuitry, reduces cost, and increases reliability. If desired, the modulators can be fabricated on a single integrated circuit chip.

In accordance with one aspect of the invention, the modulator processor can operate in one of several operating states so the input data can be automatically summed with the processed local data of the modulator, or can be passed straight through to the next processor without summing, or can be discarded so that only the processed local data is passed on to the next processor. If desired, automatic switching between the operating states can be executed in response to detected input data errors. The input data can comprise, for example, summed voice channel data from a series of preceding modulators.

In accordance with another aspect of the invention, each modulator processor includes parity data in its output and has the ability to automatically disable the input data from the summation function if the parity data received with the input is incorrect. The parity data can be used to check for faults that might be introduced, for example, by a faulty transmission or broken hard-wired interconnect or data framing errors. When a parity error in the input data is detected and the summation function of the modulator is disabled, the error can be indicated to a channel element microprocessor. In this way, input data from all prior modulators can be ignored and the processed local data from the modulator can be passed on without summation.

Other features and advantages of the present invention should be apparent from the following description of the preferred embodiment, which illustrates, by way of example, the principles of the invention.

DESCRIPTION OF THE PREFERRED EMBODIMENT

Figure 2:
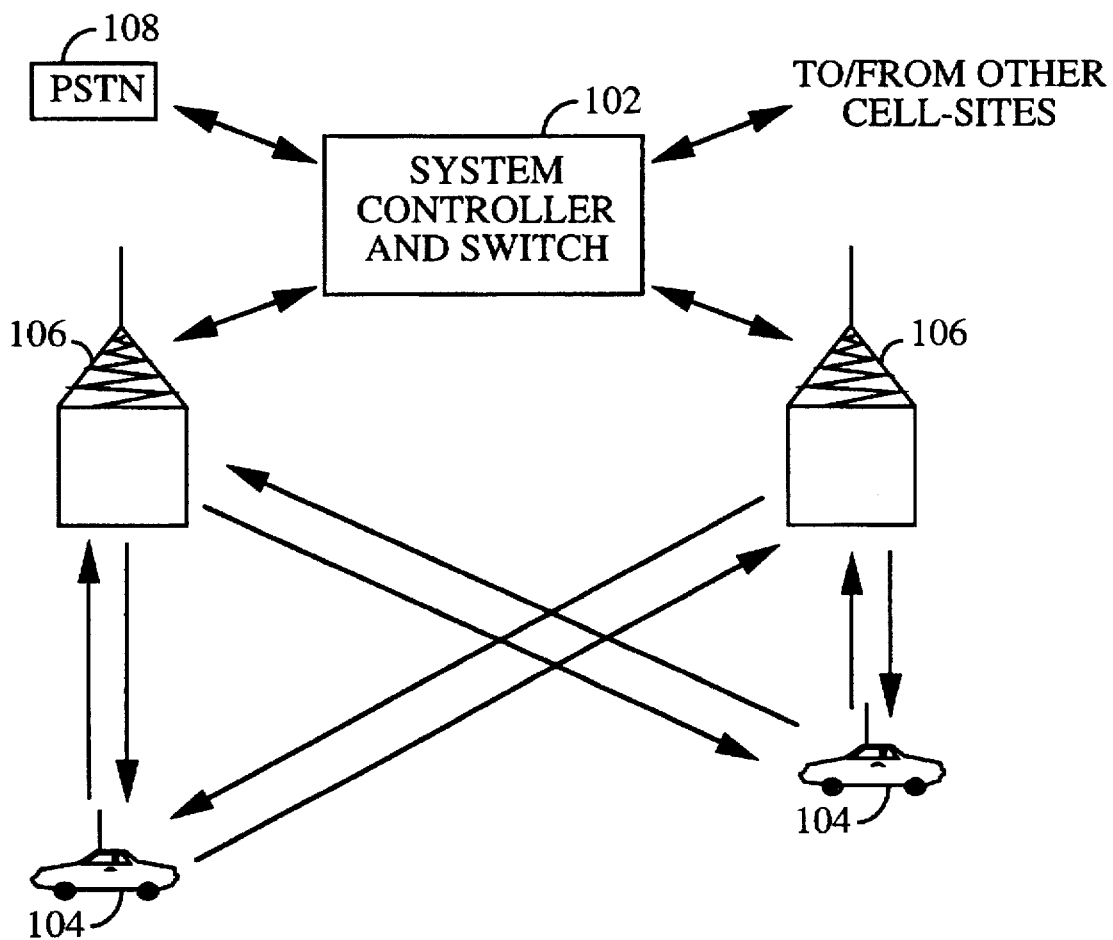
FIG. 2 is a schematic representation of an exemplary CDMA telecommunications system.

The present invention can be implemented in a wide variety of data transmission applications and in the preferred embodiment is implemented within a spread spectrum multiple access communication system of FIG. 2 for voice channel and data transmission. In the communication system, a system controller and switch, also referred to as a mobile telephone switching office (MTSO) 102, performs interface and control functions to permit calls between mobile units 104 and cell sites 106. The MTSO also controls the routing of calls between a public switched telephone network (PSTN) 108 and the cell sites for transmission to and from the mobile units. The mobile units typically do not communicate directly with each other, but communicate through the MTSO and PSTN. With respect to voice channel data transmission and processing, the communication system operates in accordance with the CDMA techniques described in the above-referenced patents.

Figure 3:
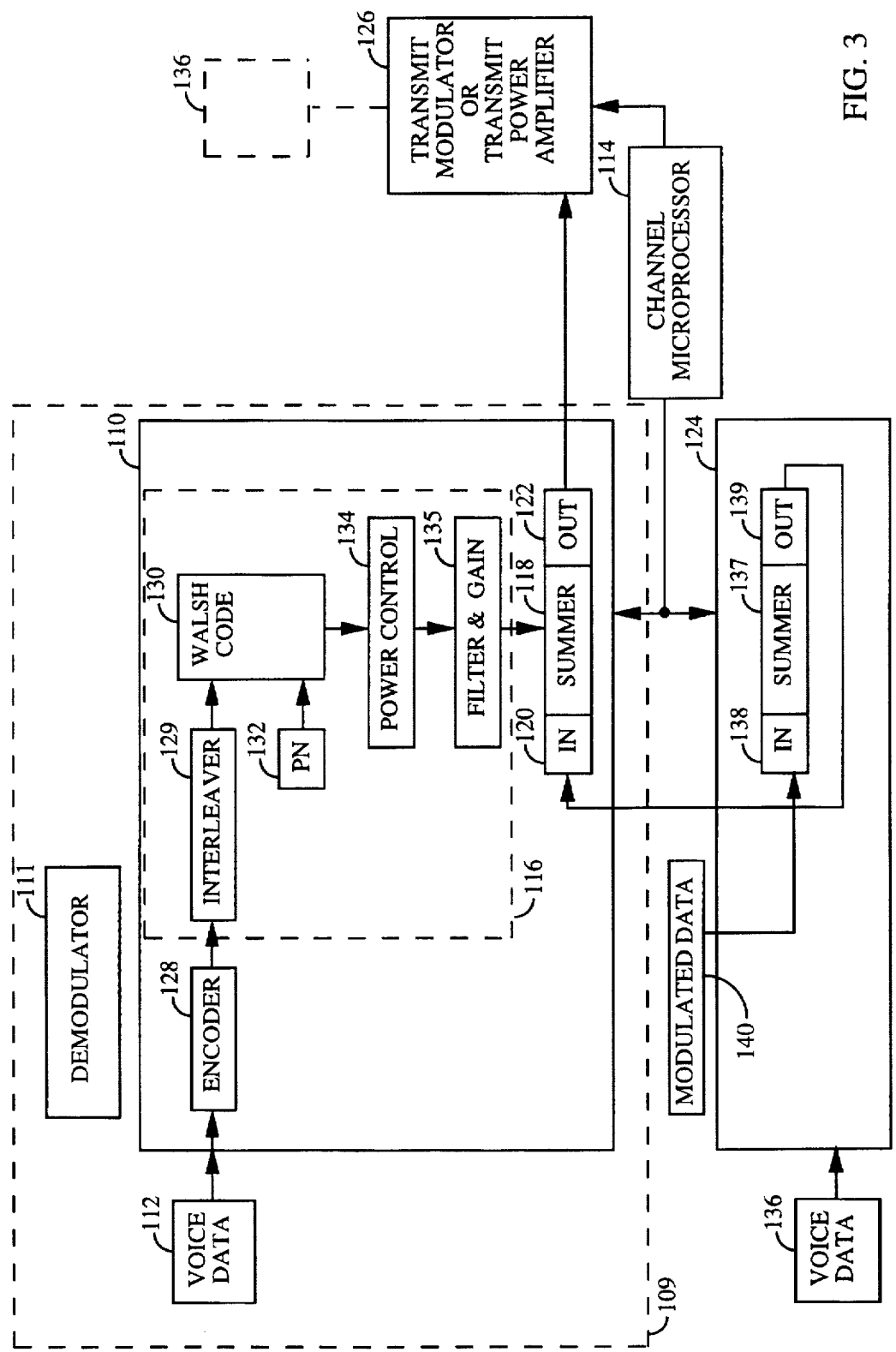
FIG. 3 is a block diagram of a cell site modem, including a modulator processor, that is constructed in accordance with the present invention.

FIG. 3 illustrates a first cell site modem 109 of the communication system of FIG. 2 that is associated with a single call channel. The modem includes a modulator 110 and a demodulator 111. The modulator 110receives local data, which can comprise voice data, for example, from a data block 112. The modulator operates under control of a channel element microprocessor 114 to process the local voice channel data with a modulation block 116 that generates modulated voice channel data. The modulator also includes an internal summer 118 that can receive independently modulated data from a second modulator 124, sum the two modulated data streams, and output the sum to a system output power amplifier or, alternatively, to a third modulator 126. Second modulator 124 in turn receives modulated data 140 from another modulation block generated in similar manner to that from modulation block 109. Thus, the modulator 110 can be serially connected with a prior modulator 124 and a subsequent modulator 126. In this way, the sum of several independent data signals can be produced by permitting the modulator 110 to directly receive data from another modulator and produce a summed output including its own local data, rather than relying on a separate, discrete summer. A modulator constructed in accordance with the present invention thereby simplifies the hard-wired interconnections to produce summed output, thereby increasing the reliability of the system and reducing costs.

Figure 1:
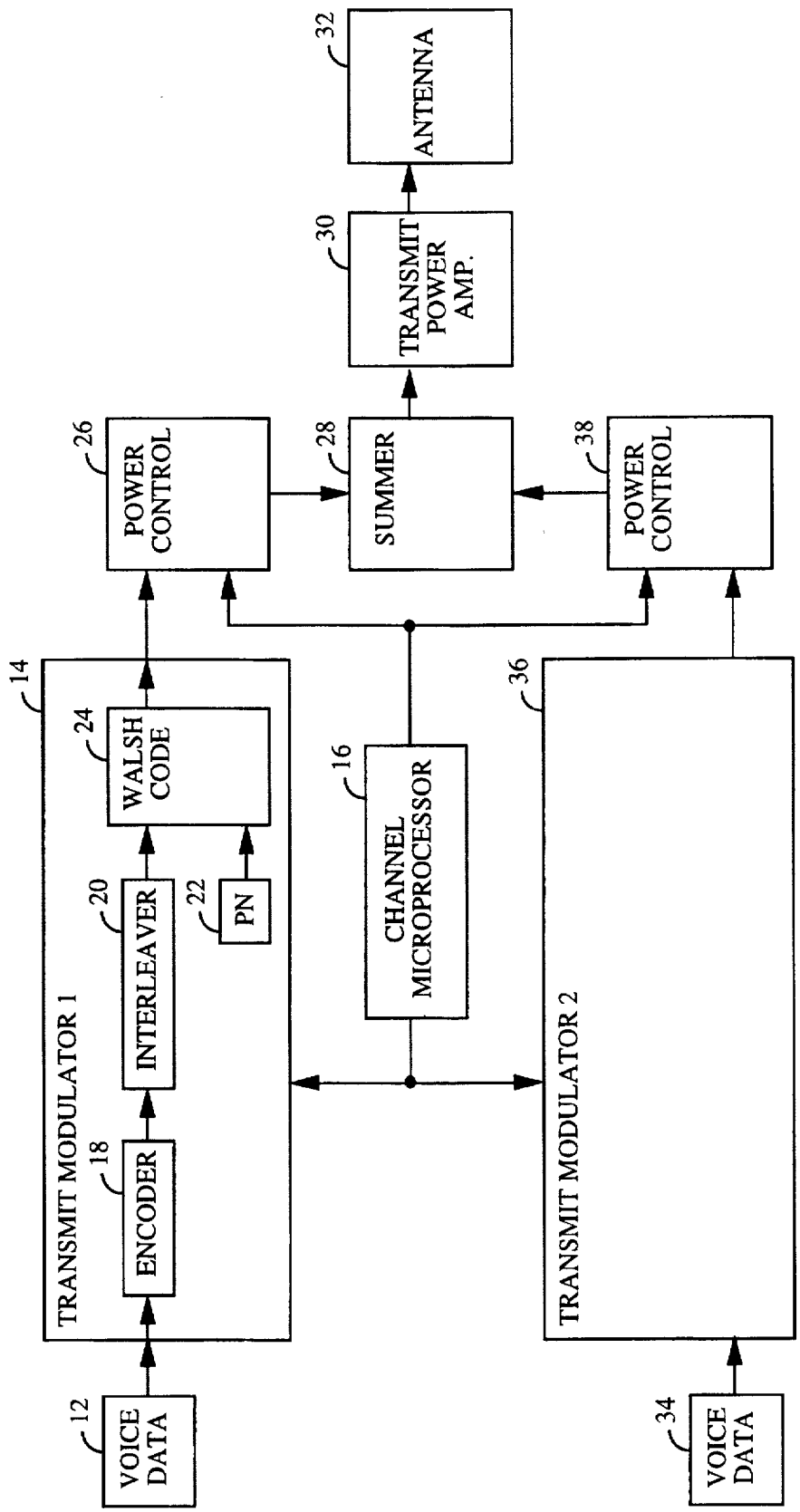
FIG. 1 is a block diagram of a prior art spread spectrum telecommunications network modulation system.

The modulator 110 of FIG. 3 can be constructed with integrated circuit techniques such that at least the modulation block 116 and summer 118 can be implemented in a single integrated circuit chip. The other modulators 124 and 126 can be implemented as single chips and can be connected through board-level printed circuit lines or the other modulators can be constructed on the same integrated circuit chip with the first modulator 110. In either case, the interconnections necessary to serially connect and sum the output from multiple modulators is less complicated in terms of topology and number of interconnections as compared with discrete external summers such as illustrated in FIG. 1, thereby increasing reliability and reducing cost.

More particularly, in the preferred embodiment, the output from the modulator 110 is produced in sample sizes of fifteen bits of output data and one bit of parity data, although modulation block 116 has only eleven bits of dynamic range and therefore only produces eleven bits of data. The extra bits provide the headroom required when summing many independent samples and streams. The sample data is produced in I and Q channels at a rate of 2.5 MHz, thereby producing a data stream of 80 Mbits per second. Each modulator includes four parallel output lines. These output lines represent two bits of I data and two bits of Q data and require eight clock cycles at 20 MHz to represent sixteen-bit I and Q samples. The channel element microprocessor 114 produces control signals for use by the various processing elements.

The modulation block 116 illustrated in FIG. 3 includes an encoder 128 that processes the local data from the data block 112 and provides the processed local data to an interleaver 129 and then to a Walsh code processor 130. The Walsh code processor also receives data from a PN sequence processor block 132. The PN block generates PN-I and PN-Q data used for signal spreading. After the Walsh code processor 130 processes the data stream, the processed data is provided to a power control block 134, which adds power transmit control bits to generate the modulated channel data, and then to a filter and gain block 135 to control signal bandwidth and set an output level. The processed data is then provided to the internal summer 118.

It is to be understood that the second modulator 124, as well as the third modulator 126 if provided, include a modulation block constructed in a manner similar to the block 116 with an encoder, interleaver, Walsh code processor, PN sequence processor, power control block, filter and gain block, and summer as shown in connection with the first modulator 110. Such details are not shown in FIG. 3 for simplicity and ease of understanding. Similarly, the other modulators 124, 126 may receive data from respective local data blocks 136. For any particular modulator, the data output from the respective modulation block will be referred to as local channel data and is distinguished from the input channel data received from another modulator. The other modulators also include internal summers 137 each having input registers 138 and output registers 139.

The summers 118, 137 operate in a normal state in which the input data received from a previous modulator processor is summed with local data to produce output data that is supplied to a subsequent modulator processor in a chain (or as final output to a processor block). The summers also advantageously operate in a bypass mode in which the input data is passed through and a local mode in which the input is discarded.

Figure 4:
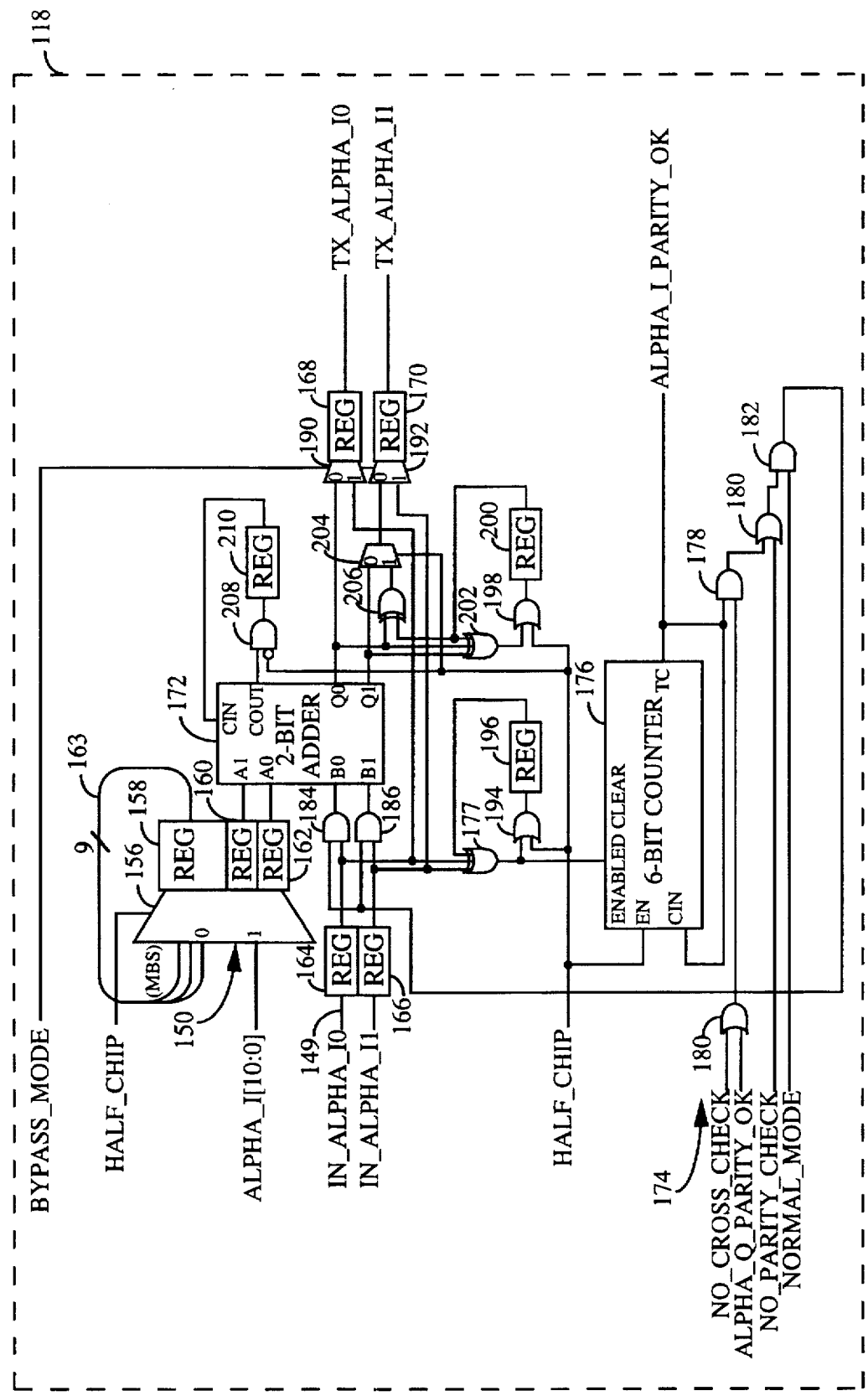
FIG. 4 is a block diagram of a summer illustrated in FIG. 3.

Some of the elements of the first summer 118 are shown in greater detail in the block diagram of FIG. 4. It should be understood that the geographic area covered by the cell sites 106 illustrated in FIG. 2 include three sectors each requiring an independent modulator in each cell site modem. FIG. 4 illustrates the summer elements associated with the channel data intended for only one of those sectors. In FIG. 4, the channel has arbitrarily been designated the Alpha channel. The PN-I data from the Alpha sector is arbitrarily shown for purposes of illustration. The channel data received by the summer 118 from modulation block 116 (FIG. 3) is received in eleven-bit samples from an input data bus labelled "alphad_I [10:0]". It should be understood that the complete channel data elements for modulator 110 would include Alpha sector PN-Q sequence voice channel data processing. The cell site modem 109 requires modulators for the two other cell sectors called Beta and Gamma and their associated PN-I and PN-Q data streams. Thus, a total of six sets of processing blocks such as illustrated in FIG. 4 are used in a cell site modem.

The processing within summer 118 is accomplished two bits at a time, in a data stream of odd-numbered bits and a data stream of even-numbered bits. The summer processes eight-bit pairs of data to represent each sixteen-bit data sample. The bit pairs are ordered in time, beginning with the least significant bits and proceeding to the most significant bits. Thus, the summer must be aligned in time to the input samples. The summer accomplishes this with a signal called "half_chip" and a data serializer 150. The half_chip signal is a pulse that goes high with the start of each new data sample and is used to initialize states in the summer circuitry.

Figure 5:
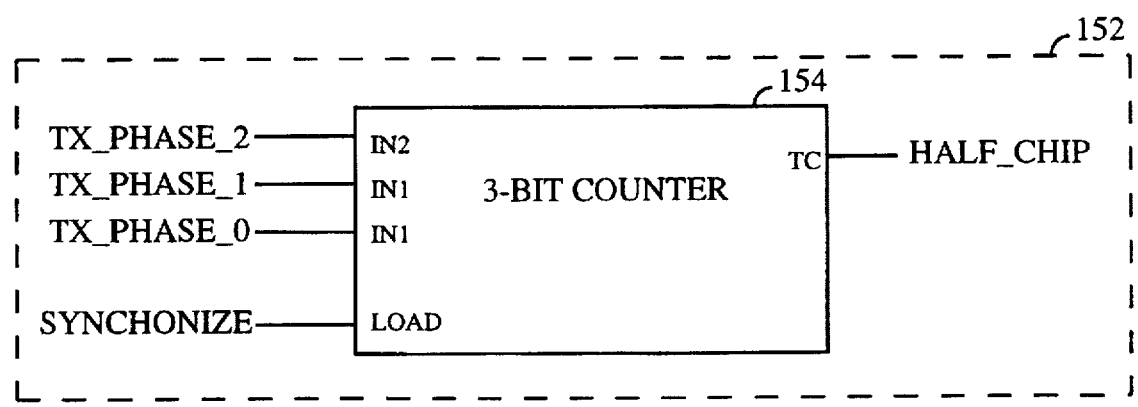
FIG. 5 is a block diagram of a timing circuit of the modulator processor illustrated in FIG. 3.

FIG. 5 shows a timing circuit 152 that produces the half_chip signal. The timing circuit includes a three-bit counter 154 that can be shared by all of the transmit summers of a cell site modulator. The three-bit counter produces a half-chip signal transition from the TC output pin every eight clock cycles of the system clock. The illustrated SYNCHRONIZE input signal causes the state of the three-bit counter to be loaded from the transmit (TX) phase inputs and is synchronized with system time. The three-bit counter receives three transmit phase selection signals called TX_PHASE_0, TX_PHASE_1, and TX_PHASE$_{13}$ 2. The TX phase inputs describe where this particular cell site modem is in the input summation chain (see FIG. 3). The half_chip signal occurs at a one-of-eight clock cycle rate because, as noted above, the output lines require eight clock cycles to represent each sample.

As shown in FIG. 4, the half_chip signal is received at the serializer 150, which receives the local data and reads it out two bits at a time. More particularly, the serializer includes a multiplexer 156 that receives the half_chip signal and an associated register 158, 160, 162 that receive the data stream identified in FIG. 4 as alpha_I and shift the data stream down two bits at a time on the half_chip signal. The multiplexer 156 and associated register 158 utilize a nine-bit wide serial bus 163 to serialize the incoming data so as to produce the PN-I even and odd data bits, which are placed at the two output registers 160 and 162, respectively, for use by the rest of the summer circuitry.

The summer input registers 120 illustrated in FIG. 3 for receiving input data from an off-chip summer are implemented as a pair of external input registers 164, 166 shown in FIG. 4 receiving data streams identified as "IN_ALPHA_I0" and "IN_ALPHA_I1", respectively, to indicate that the Alpha sector, previously modulated PN-I data is being received in a stream of even and odd bits. Other implementations of the input registers will occur to those skilled in the art. The summer output registers 122 illustrated in FIG. 3 for providing output data are implemented as shown in FIG. 4 as a pair of output registers 168, 170. The Alpha sector output data is identified as "TX_A_I0" and "TX_A_I1" and comprises even and odd bits, respectively. It should be noted that the input "IN" and output "TX" signals are of the same format with a two-clock delay from input registers 164, 166 to output registers 168, 170 regardless of whether the input data is bypassed or summed.

Figure 6:
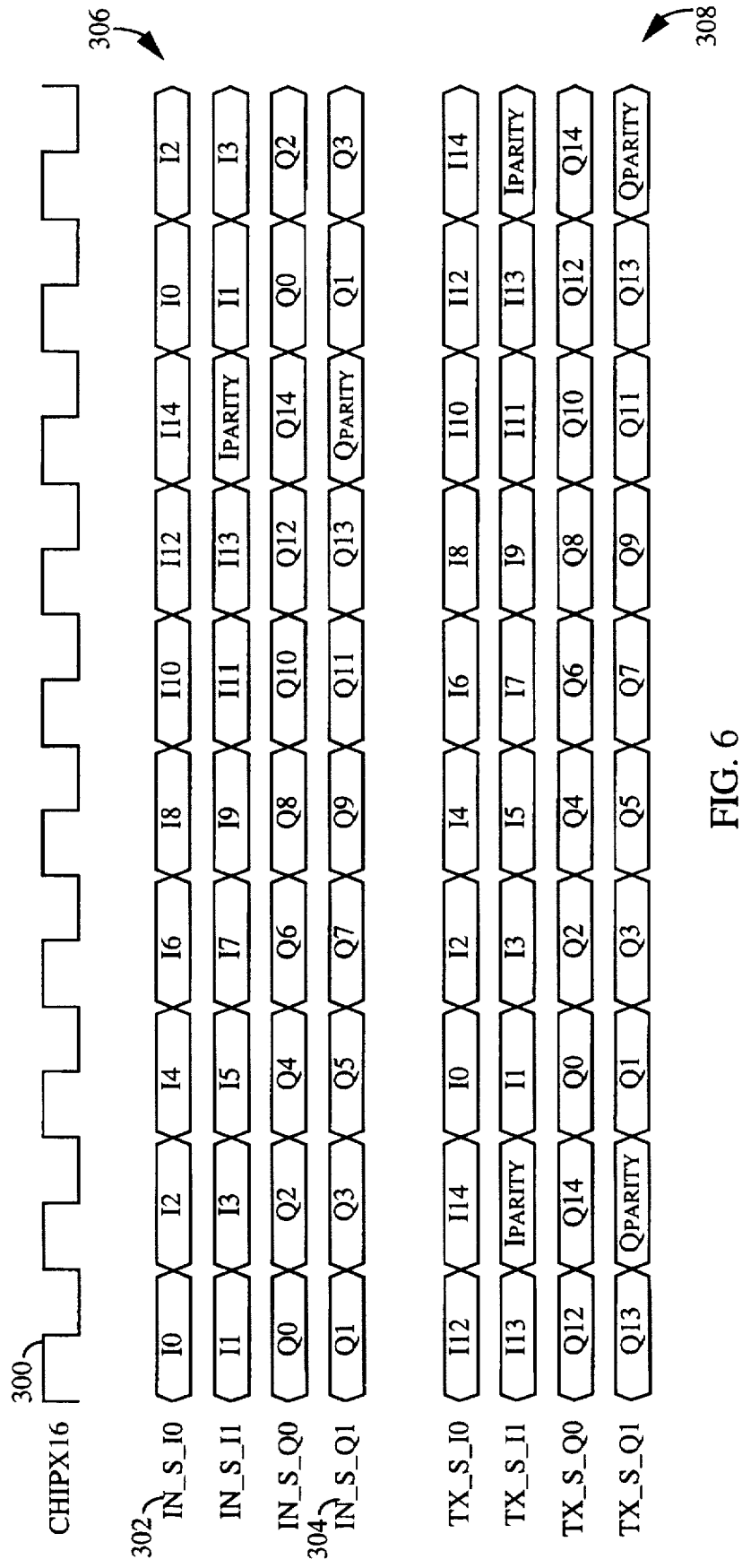
FIG. 6 is a representation of the data signals at input registers and output registers of the modulator processor illustrated in FIG. 3.

The relationship between the input data stream "IN" and the output data stream "TX" is illustrated in FIG. 6, which is a data timing chart in which a system clock signal 300 is identified as CHIPx16. The PN-I and PN-Q sequence data is shown being received two bits at a time, split between odd and even bits. For example, one input signal stream 302 is identified as "IN_s_I0" to indicate even-numbered PN-I input bits for the sector "s" signal and another input signal stream 304 is identified as "IN_s_Q1" to indicate odd-numbered PN-Q input bits for the sector "s" signal. In the preferred embodiment, for example, cells are divided into three sectors and the cell site sectors are designated as Alpha, Beta, and Gamma. FIG. 6 shows that every eighth CHIPx16 clock pulse, the relative data bit position of the received data (such as I0, or I3, or Q1, and so forth) is repeated. That is, the data streams have a cycle time of eight CHIPx16 clock cycles. FIG. 6 also shows the two-clock delay of the preferred embodiment.

Thus, the summer 118 receives processed local data from the processing block 116 (FIG. 3) at the input registers 160, 162 and receives input data from another modulator summer at the external data input registers 164, 166. The two input streams can be summed over eight clock cycles and provided as transmit output data bits at the two output registers 168, 170.

As noted above, the summer 118 can operate in one of three modes, either bypass, local, or normal mode. In the bypass mode, there is no summing of the external, input data with the processed local data. Rather, the input data is routed directly through the summer, with only a delay in the data stream due to the input and output registers of the summer. In the local mode, data at the output registers 168, 170 is received from the processed local data input registers 160, 162 only. Any data at the input data registers 164, 166 is not summed with the processed local channel data. In the normal mode, data at the output registers is formed as the sum of the newly modulated channel data and the previously modulated channel data received at the input registers. A signal identified as "BYPASS_MODE" places the modulator 110 in bypass mode and a signal identified as "NORMAL_MODE" controls switching the modulator into normal mode from local mode when not in bypass mode.

The summing of the two data streams in the normal operating mode is provided by a two-bit adder 172. As illustrated in FIG. 4, the two-bit adder receives the processed local even and odd bit data stream from the input registers 160, 162 at input ports labelled A0 and A1, respectively. The adder receives the previously modulated even and odd data from the external input data registers 164, 166 at input ports labelled B0 and B1, respectively. The adder also receives a carry input bit "cin" from the carry register 210. The even and odd data stream adder output is provided at output ports labelled Q0 and Q1, respectively. The carry output bit of the adder 172 is labelled "cout". The even and odd adder output is provided to the output registers 168, 170, respectively.

Those skilled in the art will appreciate that in the described embodiment, two clock pulses are required for a data bit to propagate through the summer 118, however, other embodiments that can allow propagation in alternative manners, are well known in the art. Additionally, one clock cycle is used to latch the input data and another clock cycle is used to latch the output data. The data bits will be placed in the input registers 160, 162, 164, 166 for the two-bit adder 172 with a first clock pulse and then will be placed in the output registers 168, 170 with a second clock pulse. This is illustrated in the data timing chart of FIG. 6, where a given input data bit (such as bit I0 of the IN_s_I0 data stream) that occurs at one CHIPx16 pulse appears as an output data bit (such as bit I0 of the TX_s_I0 data stream) two CHIPx16 clock pulses later.

The summing of the two data streams is controlled in part by a parity check block 174 comprising a six-bit counter 176 and a series of logic gates. Other circuits that perform the parity clock function are well known and can be substituted for parity check block 174 including the use of a shift register instead of counter 176. The parity check is performed with an exclusive-OR gate 177 tied to the output lines of the external previously modulated data input registers 164, 166. In particular, the six-bit counter 176 counts the number of consecutive input signals with good parity. The parity is evaluated when the half_chip signal is received by the counter. If the count of the six-bit counter is less than sixty-three, then the signal appearing at the TC output port of the six-bit counter is low. This output signal is called "alpha_I_parity_ok" in the drawing to indicate that a high signal level indicates no parity error. This parity signal is provided to the channel microprocessor 114 (FIG. 3) and also to one input of an AND gate 178. The other input of the AND gate is a signal received from the logical product of a "NO_CROSS_CHECK" signal and an "alpha_Q_parity_ok signal".

The NO_CROSS_CHECK signal is a signal received from the channel element microprocessor 114 that is set high if no cross checking of I and Q channel parity data is desired. The alpha_Q_parity_ok signal is the parity output signal of a six-bit parity counter (not illustrated) processing the same-sector (Alpha), Q channel data stream. Thus, the Beta channel and Gamma channel sector summers have the ability to cross-check parity and therefore the I channel summer of each sector receives the Q channel summer data, while the Q channel summer receives the I channel summer data. The NO_CROSS_CHECK signal and alpha_Q_parity_ok signal are sent through an OR gate 180 to produce the logical product signal for the AND gate 178.

Thus, if either the NO_CROSS_CHECK signal is high (no cross check desired) or if the alpha_Q_parity_ok signal is high (no opposite channel parity error), then a no parity error condition from the six-bit counter 176 produces a high level output from the parity cross-check AND gate 178. If both cross-check signals are low, meaning that cross check is desired and that the opposite channel has a parity error, then the output from the parity cross-check AND gate 178 will be low regardless of the six-bit counter 176 output.

In the parity check block 174, the output of the cross-check AND gate 178 is next provided as one input to an OR gate 180 whose other input is a NO_PARITY_CHECK signal. The NO_PARITY_CHECK signal is high if no parity checking of the received external input data is desired. Thus, if both gate inputs are low, indicating that the NO_PARITY_CHECK signal is low and either no cross-checking was desired and opposite channel parity was bad or I channel parity was bad, then the output of the OR gate will be low. Next, the output of the OR gate 180 and the NORMAL_MODE signal received from the channel element microprocessor are applied to a normal mode summing control AND gate 182 to control the summing of the external input data.

When the output from the normal mode summing control AND gate 182 is high, the output from the external input registers 164, 166 is applied through external input AND gates 184, 186 to the B0 and B1 input ports of the two-bit adder 172. When the normal mode summing control AND gate output is low, the external input data to the two-bit adder is turned off and the summing function is disabled, placing the summer in a local operating mode. Therefore, if a parity error occurs on the incoming external input data stream, the summer may automatically activate the local operating mode and stop adding the external input data into the output data stream. In this way, all data from modulator summers that are upstream in a string of serially connected modulators will be discarded.

Thus, it should be clear that the summing function is disabled if (1) the NORMAL_MODE signal is low or if (2) both the NO_PARITY_CHECK signal is low and either (a) the alpha_I_parity_ok signal is low (parity error) or (b) the NO_CROSS_CHECK signal is low and the alpha_Q_parity_ok signal is low (opposite channel parity error).

It also should be noted that the six-bit counter 176 provides a means of automatically restoring the summing function of the two-bit adder 172 after a parity error is detected if sixty-three consecutive data input cycles occur without parity error. That is, the output of the six-bit counter goes high after sixty-three consecutive pulses from the input data exclusive-OR gate 177 that receives the external even and odd data bits and produces odd parity. Thus, the output of the six-bit counter goes high after sixty-three clock cycles with no off-chip data input parity error.

The bypass mode does not directly affect the summing operation, but selects the data for the output registers 168, 170 as coming either from the Q0 and Q1 output ports of the two-bit adder 172 or from the external input registers 164, 166. The selection of output from the external input registers occurs when the bypass mode is selected, which occurs when a signal called "BYPASS_MODE" goes high. The BYPASS_MODE signal selects between the "0" and "1" set of input lines of a pair of output multiplexers 190, 192 from which the output registers 168, 170 provide the TX_ALPHA_I0 and the TX_ALPHA_I1 data. That is, if the BYPASS_MODE signal is set to "0", then the output multiplexers select incoming data from the summed output ports Q0 and Q1 of the two-bit adder 172. If the BYPASS_MODE signal is set to "1", then the output multiplexers select incoming data from the external input data registers 164, 166 to get the ALPHA_I data stream. When the bypass mode is selected, then as noted above the data appearing at the output registers 168, 170 will be a two-clock-pulse-delayed copy of the data at the external input registers 164, 166. In this way, the BYPASS_MODE signal selects whether the summer processing will be bypassed.

The bypass mode provides a convenient means of resetting and bypassing individual summers. For example, a reset register (not illustrated) can be set such that, when the register value is set to high level, it produces a high signal that is used as the BYPASS_MODE signal. The channel element microprocessor 114, for example, can control the setting of the reset register. The channel element microprocessor might choose to bypass a summer if, for example, the configuration of the cell station modulator 110 is such that the summation function of a summer is not being used. The bypass mode feature provides a means of bypassing a summer with relatively high reliability, because the only hardware components that must be properly functioning for the bypass mode to work properly are the BYPASS_MODE signal line, the external input registers, the output registers, and the associated multiplexers.

The half_chip signal referred to above in conjunction with the timing circuit 152 also is provided to various other logic elements of the summer to ensure that register values, data indexes, and the like are initialized, where appropriate, with every new data sample. Thus, the half_chip signal is provided to an external input parity check OR gate 194 so the parity count maintained in a register 196 from the parity exclusive-OR gate 177 is set for each new data sample. Similarly, the half_chip signal is provided to a summation output parity generate OR gate 198 so the parity count maintained in a register 200 for a two-bit adder from the parity exclusive-OR gate 202 is set for each new data sample. The half_chip signal also is provided to a multiplexer 204 that selects data from either the Q1 output of the two-bit adder 172 or the output of an exclusive-OR gate 206, which is supplied with the Q0 output of the adder and the output from the adder parity register 200.

Finally, the half_chip signal also is provided, after being inverted, to an input of a carry-in AND gate 208. The carry-out signal "cout" from the two-bit adder 172 is the other input of the carry-in AND gate, whose output is provided to a register 210 that, in turn, provides its output to the carry-in pin "cin" of the two-bit adder.

Figure 7:
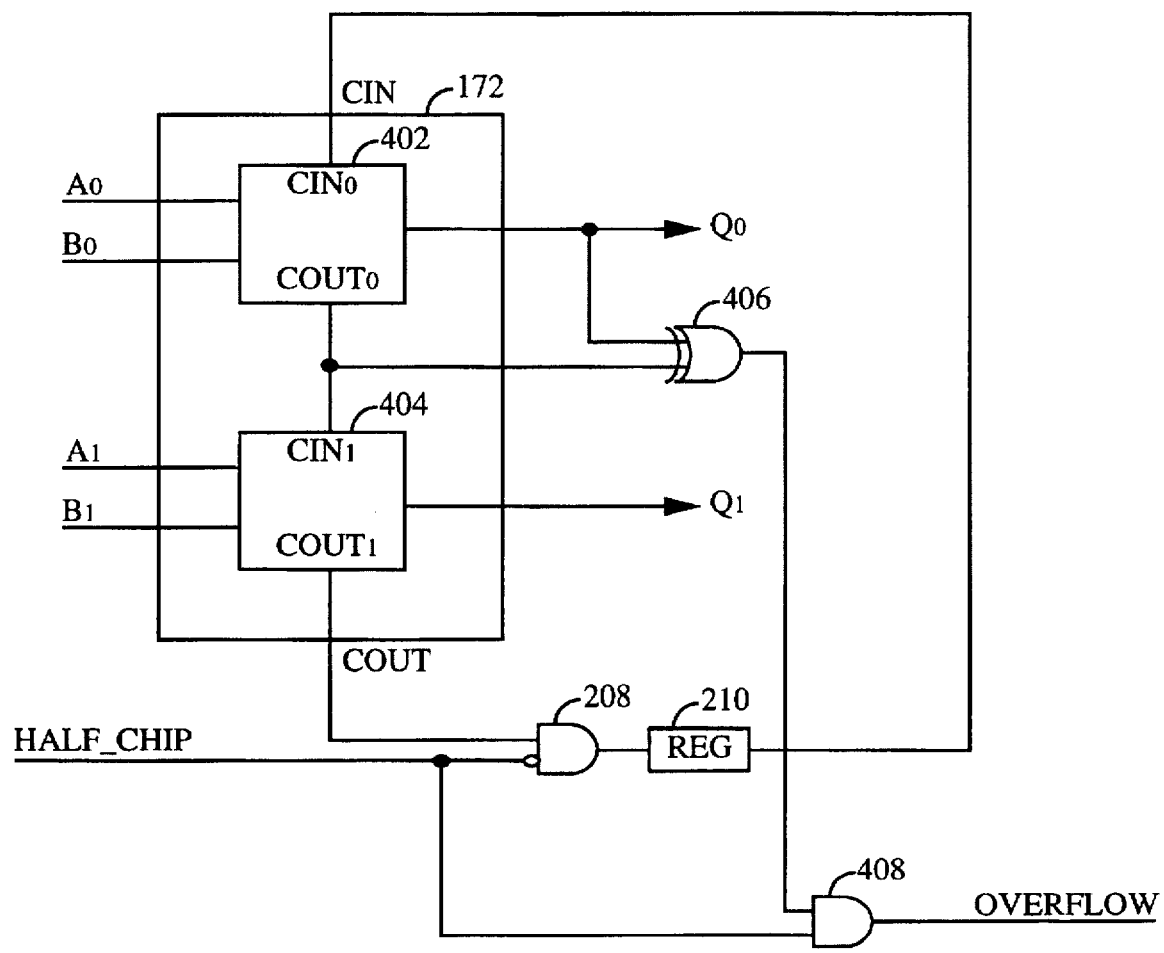
FIG. 7 is a block diagram of a summer, constructed in accordance with the present invention, that also includes an overflow condition detector.

If desired, the summer 118 can detect an overflow condition of the two-bit adder 172. An overflow condition might indicate, for example, faulty data, a data framing error, or a broken interconnect. FIG. 7 illustrates how such an overflow detection could be implemented in the summer.

FIG. 7 shows that the internal construction of the two-bit adder 172 can include two one+it adders 402, 404 that receive the A0, B0 even data bits and A1, B1 odd data bits, respectively. The one-bit adders 402, 404 produce the Q0 and Q1 output bits, respectively. The carry-out signal $cout_0$ from the even adder 402 is provided to the carry-in input $cin_1$ of the odd adder. The carry-out signal $cout_1$ of the odd adder 404 is the carry-out signal cout of the two-bit adder 172. FIG. 7 shows that the Q0 output and the carry-out signal $cout_0$ of the even adder are provided to an exclusive-OR gate 406. The exclusive-OR gate output and the half_chip signal are provided to an overflow AND gate 408 to produce an overflow signal.

The overflow signal is used much like the alpha_I_parity_ok signal to control operation of the summer and is provided to the enabled clear pin of the six-bit counter 176 (along with the output of the exclusive-OR gate 177). Thus, if the overflow signal goes high, the summer is automatically placed in the local mode and its output is deleted from the chain of serially connected modulators.

With eleven data bits and a parity bit, used in the data stream, the data structure defined in the preferred embodiment leaves four bits of headroom. The four bits of headroom indicates that up to sixteen modulated voice channel signals can be summed without worry about overflow on summation. Thus, while the FIG. 1 modulator configuration permitted the output from two modulators to be connected together with a hard-wired discrete summer and associated control circuitry, the modulator in accordance with the present invention permits up to sixteen modulators to be connected together before a hard-wired discrete summer interconnect and associated control circuitry must be used. This reduction in the number of interconnections reduces the space requirements of the system, reduces cost, and increases reliability.

Thus, the modulator processor described above includes an integrated summer that receives local data and also receives input data from a second modulator. The modulator can sum both streams of data and output the sum. The output data can be provided to a next modulator for summing or can be provided as final output in a series of modulators to a transmit power amplifier for broadcast over the telecommunication system. Parity checking of the input data permits erroneous data to be ignored and prevents errors from being propagated. In this way, the number of components and hard-wired interconnections necessary for serially linking modulators is reduced, thereby resulting in reduced space requirements, reduced cost, and increased reliability.

The present invention has been described above in terms of a presently preferred embodiment so that an understanding of the present invention can be conveyed. There are, however, many configurations for cellular telephone communication modems and systems not specifically described herein but with which the present invention is applicable. The present invention should therefore not be seen as limited to the particular embodiment described herein, but rather, it should be understood that the present invention has wide applicability with respect to communication modems generally. All modifications, variations, or equivalent arrangements that are within the scope of the attached claims should therefore be considered to be within the scope of the invention.

We claim:

1. An apparatus for use in a spread spectrum telecommunication system for generating a signal for subsequent broadcast over the system comprising:

a first set of processed data;

a first modulation block for generating a second set of processed data in response to a first set of input data;

a first summer for generating a third set of processed data by summing said first set of processed data with said second set of processed data;

a second modulation block for generating a fourth set of processed data in response to a second set of input data;

a second summer for generating a fifth set of summed output data by summing said third set of summed output data with said fourth set of processed data;

a controller for controlling said first summer and said second summer; and a transmitter for generating broadcast signals in response to said second set of summed output data.

2. An apparatus as defined in claim 1, wherein the spread spectrum telecommunication system comprises a code division multiple access system and the modulation block includes a PN sequence processor and a Walsh chip processor.

3. An apparatus as defined in claim 1, wherein the first and said second modulation block and said first and said second summer are implemented in a single integrated circuit chip.

4. An apparatus as defined in claim 1, wherein the input data includes parity data.

5. An apparatus as defined in claim 4, wherein the first and the second summer include a parity check block that adds parity data to the local data and also includes a counter that determines if the input data includes a parity error.

6. An apparatus as defined in claim 5, wherein the first summer does not add the input data to said first set of processed local data if the input data includes a parity error.

7. An apparatus as defined in claim 6, wherein the first summer sets the input data to zero if a predetermined number of consecutive data inputs have not been free of parity error.

8. An apparatus as defined in claim 4, wherein the first summer receives a control signal that causes the summer to operate in either a bypass mode, local mode, or normal mode, such that in the bypass mode the summer delays the input data by two clock pulses and then produces the output data, in the local mode the first summer does not add the input data to the local data, and in the normal mode the summer adds the input data to the local data and produces the sum as the output data.

9. An apparatus as defined in claim 8, wherein the first summer performs a parity check on the input data and discards the input data if a predetermined number of consecutive data inputs have not been free of parity error.

10. A modem in an integrated circuit for a spread spectrum telecommunication system that modulates a mobile signal comprising a plurality of call signals with a transform function, producing a coded signal, and demodulates a coded signal received by at least one receiving antenna of a telecommunications system, the modem comprising:

a demodulator that processes a received signal sample;

a modulator comprising a modulation block that receives local data and modulates it, thereby generating processed local data, an input block that receives external input data modulated externally from said integrated circuit, a summer that sums the external input data from the different modulator with the local data and generates summed output data, and an output block that receives the summed output data; and a controller that controls the demodulator and modulator to carry out their respective processing, wherein, said modulation block includes a PN sequence processor and a Walsh chip processor and the input data includes parity data and the summer includes a parity check block that adds parity data to the local data and also includes a counter that determines if the input data includes a parity error.

11. A modem as defined in claim 10, wherein the summer receives a control signal that causes the summer to operate in either a bypass mode, local mode, or normal mode, such that in the bypass mode the summer places the input data at the output block, in the local mode the summer does not add the data on the input block to the input data, and in the normal mode the summer performs a parity check on the data at the input block and disconnects the data if a predetermined number of consecutive input data inputs have not been free of parity error and otherwise adds the input data to the local data and provides it to the output block.

12. A method of summing channel data from a plurality of users in a spread spectrum telecommunication system, the method comprising the steps of:

receiving data words from a first user of the telecommunication system and processing the data by applying a pseudo-noise sequence and a Walsh code function to the data to generate a first set of processed data;

receiving a second set of processed data from a second user;

summing said first set of processed data with said second set of processed data to produce summed output data; and providing the summed output data to an output block wherein said externally modulated data includes parity data, and said summer includes a parity check block for determining if the said externally modulated data includes a parity error, and a counter for adding parity data to the internally modulated data.

13. A method as defined in claim 12, wherein the step of providing the summed output data to an output block includes the steps of:

determining if the input data includes a parity error;

discarding the input data if it includes a parity error.

14. A method as defined in claim 13, wherein the step of discarding the data comprises setting the input data to zero if a predetermined number of input data values have not been free of parity error.

15. An integrated circuit for generating spread spectrum modulated output data that is externally accessible comprising:

user data input for receiving user data;

modulator for generating locally modulated data by modulating said user data;

modulated data input that is externally accessible for receiving externally modulated data;

summer for generating the modulated output data by summing said externally modulated data with said internally modulated data; and modulated data output for transmitting the modulated output data wherein said externally modulated data includes parity data, and said summer includes a parity check block for determining if said externally modulated data includes a parity error.

16. The integrated circuit as set forth in claim 15 wherein said summer receives a control signal that causes said summer to operate in one of a bypass mode, local mode or normal mode wherein, said summer provides said externally modulated data to said outputs in said bypass mode, provides said locally modulated data to said outputs in said local mode, and provides said modulated data to said outputs in said normal mode unless a predetermined number of parity errors have been detected.

17. A system for generating a direct sequence modulated signal comprising:

a first integrated circuit for generating a first set of modulated data;

a conductive connection located external to said first and second integrated circuits;

and second integrated circuit for receiving said first set of modulated data via said conductive connection, receiving a set of user data and for generating externally the modulated signal by summing said user data with said first set of modulated data; a conductive connection for transmitting said first set of modulated data wherein said externally modulated data and said second set of modulated data include parity data and said second integrated circuit includes a parity check block for determining if said externally modulated data includes a parity error, and a counter for adding parity data to said locally modulated data.

18. The system as set forth in claim 15 wherein said externally modulated data and said second set of modulated data include parity data and said second integrated circuit includes a parity check block for determining if said externally modulated data includes a parity error, and a counter for adding parity data to said locally modulated data.

19. The system as set forth in claim 18 wherein said summer receives a control signal which causes summer to operate in one of either a bypass mode, local mode or normal mode wherein, said summer provides said externally modulated data to said outputs in said bypass mode, provides said locally modulated data to said outputs in said local mode and provides said modulated data to said outputs in said normal mode unless a predetermined number of parity errors have been detected.

20. A modem for a spread spectrum telecommunication system that modulates a mobile signal comprising a plurality of call signals with a transform function, producing a coded signal, and demodulates a coded signal received by at least one receiving antenna of a telecommunications system, the modem comprising:

a demodulator that processes a received signal sample;

a modulator comprising:

a modulation block that receives local data and modulates it, thereby generating processed local data;

an input block that receives external input data from a different modulator;

a summer that sums the external input data from the different modulator with the local data and generates summed output data; and an output block that receives the summed output data; and a controller that controls the demodulator and modulator to carry out their respective processing, wherein, the summer receives a control signal that causes the summer to operate in either a bypass mode, local mode or normal mode, such that in the bypass mode the summer places the input data at the output block, in the local mode the summer does not add the data on the input block to the input data, and in the normal mode the summer performs a parity check on the data at the input block and disconnects the data if a predetermined number of consecutive input data inputs have not been free of parity error and otherwise adds the input data to the local data and provides it to the output block.

21. A modem as defined in claim 20, wherein the modulator and summer are implemented in a single integrated circuit chip.

22. A modem as defined in claim 20, wherein the input data includes parity data and the summer includes a parity check block that adds parity data to the local data and also includes a counter that determines if the input data includes a parity error.

23. The modem set forth in claim 10 wherein said external input data is a sum of a set of modulated input signals.

* * * * *